United States Patent
Lauer et al.

(10) Patent No.: US 10,151,422 B2
(45) Date of Patent: Dec. 11, 2018

(54) DRIVETRAIN PACKAGE

(71) Applicant: SEW-EURODRIVE GMBH & CO. KG, Bruchsal (DE)

(72) Inventors: Christian Lauer, Zeiskam (DE); Peter Barton, Bretten (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 15/558,123

(22) PCT Filed: Feb. 18, 2016

(86) PCT No.: PCT/EP2016/000274
§ 371 (c)(1),
(2) Date: Sep. 13, 2017

(87) PCT Pub. No.: WO2016/146234
PCT Pub. Date: Sep. 22, 2016

(65) Prior Publication Data
US 2018/0045359 A1     Feb. 15, 2018

(30) Foreign Application Priority Data

Mar. 13, 2015 (DE) ........................ 10 2015 003 144

(51) Int. Cl.
*F16M 5/00* (2006.01)
*F16M 1/08* (2006.01)
(Continued)

(52) U.S. Cl.
CPC ............. *F16M 5/00* (2013.01); *F16H 57/025* (2013.01); *F16M 1/08* (2013.01); *F16M 1/00* (2013.01)

(58) Field of Classification Search
CPC .......... B60K 1/00; B62D 21/02; B62D 21/09; F16M 5/00
See application file for complete search history.

(56) References Cited

U.S. PATENT DOCUMENTS 1,886,035 A * 11/1932 Mann .................... F04D 29/605
248/639
3,849,857 A * 11/1974 Murray, Jr. .............. F16M 7/00
248/346.06
(Continued)

FOREIGN PATENT DOCUMENTS

DE       33 07 923 A1    9/1984
DE       203 04 111 U1   5/2003
(Continued)

OTHER PUBLICATIONS

International Search Report dated Jun. 6, 2016, in International Application No. PCT/EP2016/000274. (English-language translation).
(Continued)

*Primary Examiner* — Katy M Ebner
(74) *Attorney, Agent, or Firm* — Hunton Andrews Kurth LLP

(57) ABSTRACT

A drivetrain package includes a motor which includes a rotor shaft, a gear unit, and a carrier structure. The carrier structure has a carrier part which includes a gear unit support section and a motor support part, the carrier part and the gear unit support section being arranged in one piece. The motor is mounted on the carrier structure with the aid of the motor support part, the motor support part in particular being situated between the motor and the carrier part. The gear unit is supported on the gear unit support section and connected to the carrier structure with the aid of the gear unit support section. The carrier part includes a sheet metal part, and the motor support part includes a sheet metal part. The carrier part extends farther in the direction of the rotor shaft axis than in a transverse direction to the direction of the rotor shaft axis, and the motor support part extends farther in a transverse direction to the direction of the rotor shaft axis than in the direction of the rotor shaft axis.

15 Claims, 10 Drawing Sheets

(51) Int. Cl.
*F16H 57/025* (2012.01)
*F16M 1/00* (2006.01)

(56) References Cited

U.S. PATENT DOCUMENTS

| | | | | |
|---|---|---|---|---|
| 4,117,997 A * | 10/1978 | Gitzendanner | G11B 33/08 | 248/646 |
| 4,572,474 A * | 2/1986 | Derlich | F16M 5/00 | 248/639 |
| 5,085,396 A * | 2/1992 | Mansson | B65D 85/68 | 248/676 |
| 5,160,113 A * | 11/1992 | Whiddon | F16H 57/025 | 248/638 |
| 5,488,259 A * | 1/1996 | Cho | F16M 5/00 | 310/425 |
| 5,595,256 A * | 1/1997 | Mueller | B21D 53/88 | 180/232 |
| 6,402,229 B1 * | 6/2002 | Suganuma | B62D 21/02 | 180/311 |
| 6,405,992 B1 * | 6/2002 | Palmer | F04D 29/605 | 248/679 |
| 7,028,970 B1 * | 4/2006 | Wiseman | F16M 5/00 | 108/51.11 |
| 7,191,792 B2 * | 3/2007 | Hendrix | F04B 35/06 | 137/312 |
| 7,552,903 B2 * | 6/2009 | Dunn | B63H 21/16 | 248/637 |
| 7,942,078 B2 * | 5/2011 | Leimann | F16H 57/025 | 248/205.1 |
| 7,958,963 B2 * | 6/2011 | Hornisch | B62D 21/11 | 180/312 |
| 9,257,884 B2 * | 2/2016 | Barton | H02K 5/20 | |
| 9,803,793 B2 * | 10/2017 | Davi | F16M 1/00 | |
| 2005/0263669 A1 * | 12/2005 | Murarescu | F16M 5/00 | 248/580 |
| 2009/0321607 A1 * | 12/2009 | Baron | F16F 15/022 | 248/562 |
| 2010/0025179 A1 * | 2/2010 | Behrens | F16M 5/00 | 192/76 |
| 2013/0106113 A1 * | 5/2013 | Wang | F16M 7/00 | 290/1 A |
| 2015/0093266 A1 * | 4/2015 | Nelson | F16M 5/00 | 417/321 |
| 2015/0152996 A1 * | 6/2015 | Spratt | F16M 5/00 | 248/678 |
| 2015/0176751 A1 * | 6/2015 | Spratt | F16M 5/00 | 290/1 A |
| 2015/0184591 A1 * | 7/2015 | Giancotti | F01D 25/28 | 60/798 |
| 2015/0207383 A1 * | 7/2015 | Spratt | F02M 37/007 | 290/1 A |
| 2016/0102581 A1 * | 4/2016 | Del Bono | F01D 25/28 | 290/1 A |
| 2016/0290551 A1 * | 10/2016 | Wilson | F16M 5/00 | |
| 2017/0159872 A1 * | 6/2017 | Mistry | F01D 25/28 | |
| 2017/0241293 A1 * | 8/2017 | Zaffino | F01D 25/28 | |
| 2018/0045359 A1 * | 2/2018 | Lauer | F16M 1/08 | |

FOREIGN PATENT DOCUMENTS

| | | |
|---|---|---|
| DE | 10 2006 007 637 B3 | 2/2007 |
| DE | 10 2007 028 446 A1 | 12/2008 |
| DE | 10 2008 058 521 A1 | 5/2010 |
| GB | 2 142 411 A | 1/1985 |

OTHER PUBLICATIONS

International Preliminary Report on Patentability, dated Sep. 19, 2017, in International Application No. PCT/EP2016/000274. (English-language translation).

* cited by examiner

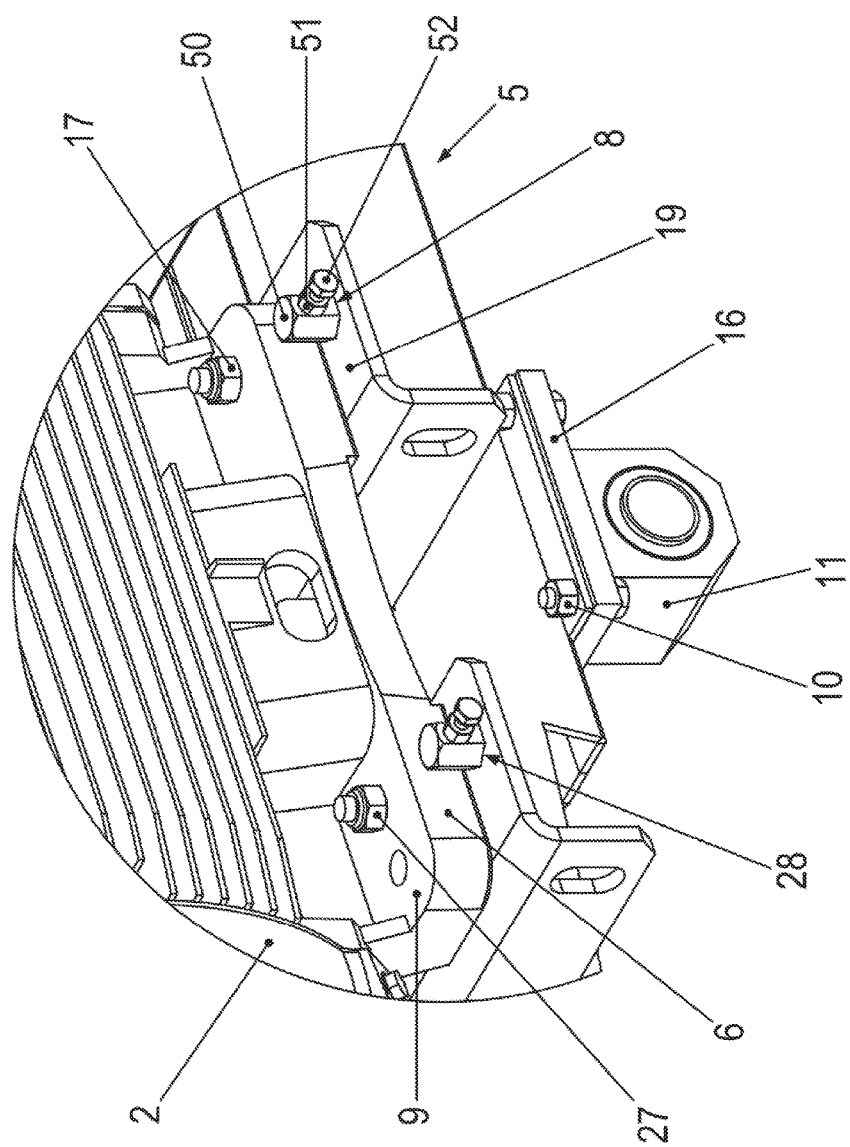

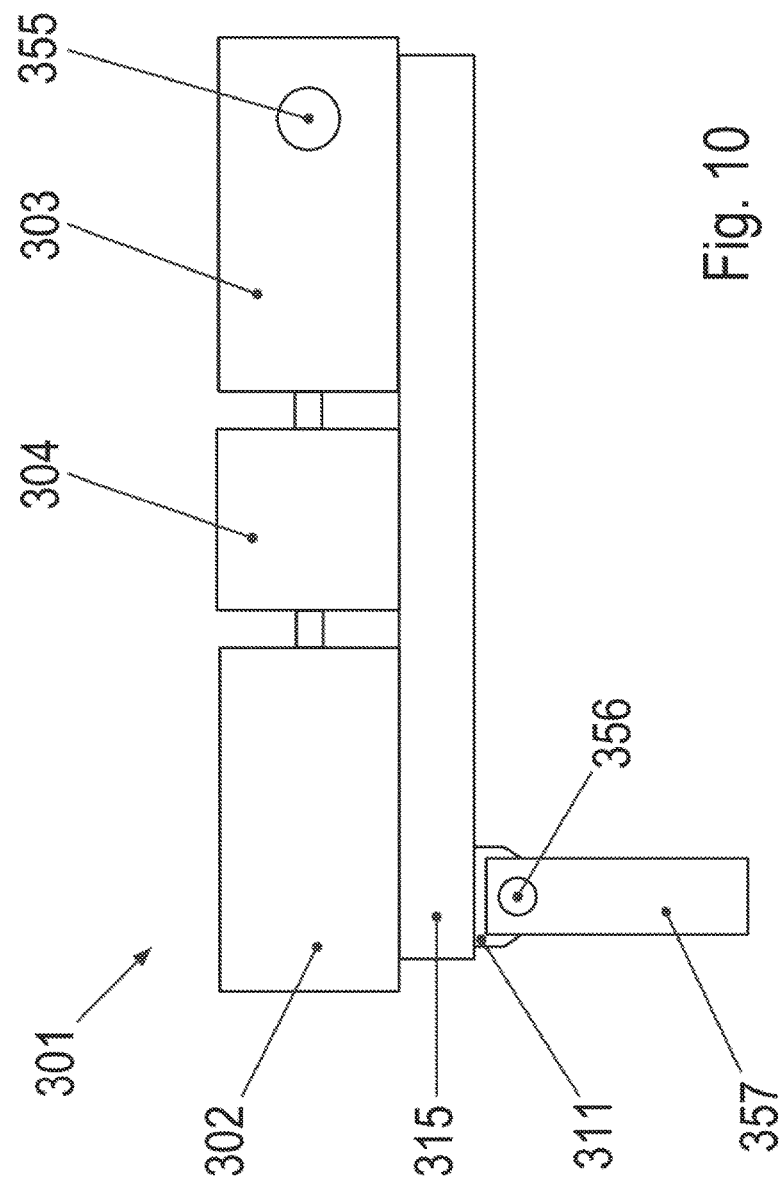

DRIVETRAIN PACKAGE

FIELD OF THE INVENTION

The present invention relates to a drivetrain package.

BACKGROUND INFORMATION

A model series of drivetrain packages and a method for producing drivetrain packages is German Published Patent Application No. 10 2008 058 521.

German Published Patent Appication No. 33 07 923 illustrates a base plate for machine units.

German Published Patent Application No. 10 2006 007 637 shows a cross member and a modular assembly system for a combined transport and setup system of a motor as well as a method for transporting and setting up a motor utilizing the cross member and modular assembly system.

SUMMARY

Example embodiments of the present invention provide a drivetrain package that may better protect the environment.

According to an example embodiment of the present invention, the drivetrain package includes a motor having a rotor shaft, a gear unit and a carrier structure.

The carrier structure has a carrier part, which includes a gear unit support section and a motor support part, the carrier part and the gear unit support section being provided in one piece.

The motor is mounted on the carrier structure with the aid of the motor support part, the motor support part in particular being disposed between the motor and the carrier part.

The gear unit is supported on the gear unit support section and connected to the carrier structure with the aid of the gear unit support section.

The carrier part includes a sheet-metal part.

The motor support part includes a sheet-metal part.

The carrier part extends farther in the direction of the rotor shaft axis than in a transverse direction to the direction of the rotor shaft axis.

The motor support part extends farther in a transverse direction to the rotor shaft axis than in the direction of the rotor shaft axis.

This is considered advantageous insofar as the carrier structure made from sheet metal parts is able to be produced in a compact and uncomplicated manner. The torsional stiffness, torsion resistance, and the vibration strength of the carrier structure are improved by the motor support part disposed transversely to the direction of the rotor shaft axis. The resonant frequency of the carrier structure may lie outside the usual motor excitation frequency.

Sheet metal parts for the production of the carrier structure can be stocked in a space-saving manner and may be cut to the specific combination of motor and gear unit in a single working step. In particular the height of the rotor shaft of the motor and the input shaft of the gear unit are adaptable to each other in that the carrier part has different heights for the motor support part and the gear unit support section.

The motor support part and the carrier part may be uncomplicated in their production and can be produced with high precision in the form of punched parts or punched and bent parts. Time-consuming postprocessing of the carrier structure such as by grinding is therefore not necessary.

The cutting pattern for the components of the carrier part may easily be transferrable to different sizes of carrier parts or to different sheet metal materials. This provides high process reliability because the cutting pattern is unambiguously transferrable.

All parts of the carrier structure may be produced from the same sheet metal. A drivetrain package for an application under extreme external conditions that require a special material, in particular a steel alloy, may therefore be produced entirely from just such a material.

In addition, it is considered advantageous that the gear unit support section is able to be produced in a single production step with the carrier part. The torsional stiffness and the vibration strength of the carrier structure are further improved by the angularly arranged gear unit support section.

The carrier structure may include a base part, and the carrier structure may be supported with the aid of the base part, in particular on a foundation, especially a floor, and the motor support part and the base part may be arranged in a similar and, in particular, an identical manner. This has the advantage that the carrier structure is able to be placed on the foundation with the aid of the base part without the risk of tilting.

Since the motor support parts are reusable as base parts, a modular system with a reduced number of parts may be realized. The motor support parts and the base parts may be stocked in an economical manner, which is better for the environment.

The base part may extend farther in a transverse direction to the rotor shaft axis than it does in the direction of the rotor shaft axis. This is considered advantageous insofar as the torsional stiffness and vibration strength of the carrier structure are further improved with the aid of the base part.

The motor support part and the base part may have in each case a first recess and a second recess, and the motor may be connectable to the carrier structure with the aid of a fastening element guided through the first recess. The first recess in particular is arranged in the form of an elongated hole that extends farther in the direction of the rotor shaft axis than it does in a transverse direction to the direction of the rotor shaft axis. The carrier structure is able to be mounted on a foundation, in particular a floor, with the aid of a fastening element that is guided through the second recess. This is considered advantageous insofar as the first recess makes it possible to vary the axial clearance between the motor and the clutch and to adjust the clutch play.

The recesses may be produced in a single working step with the motor support part and/or the base part, in the form of a punched part. This makes it possible to reduce the production outlay and to better protect the environment.

The carrier part and/or the motor support part and/or the base part may be produced as bent parts, in particular as punched and bent parts, especially as sheet metal corner plates. This is considered advantageous because bent parts have better stiffness, in particular torsional stiffness, than planar sheet metal parts. The sheet metal parts may be thinner and material and weight may be saved, which benefits the environment.

The carrier part may have two subsections that are disposed at a non-vanishing angle relative to each other, this angle in particular being between 90° and 180°, in particular between 135° and 180°, and in particular between 150° and 170°. Situated between these subsections is an edge section that extends completely through the carrier part in the direction of the rotor shaft axis. This has the advantage of further improving the torsional stiffness of the carrier structure. The carrier part may have a thinner design, which is better for the environment.

The motor support part and/or the base part may be connected to the carrier part in a form-locking manner and by an intermaterial connection, in particular by welding. This has the advantage that weld seams between the motor support part or the base part and the carrier part may be smaller than in the case of an exclusively intermaterial connection. Material is therefore able to be saved and the carrier structure may be lighter.

The carrier part may have at least one positioning slot for the connection to the motor support part or the base part. This is considered advantageous insofar as it allows for an uncomplicated positioning of the motor support part or the base part on the carrier part. Manufacturing faults are avoidable.

The positioning slot may be produced in a single production step with the carrier part, in particular by cutting or punching.

The carrier may have a carrier section, which particularly extends from the motor to the gear unit; the gear unit support section is situated at a non-vanishing angle to the carrier section, the gear unit support section in particular being situated at a right angle to the carrier section. This has the advantage of allowing the gear unit support section to be produced in a single production step with the carrier part. The torsional stiffness and the vibration strength of the carrier structure are further improved by the angularly arranged gear unit support section.

The gear unit support section may extend farther in the direction of the rotor shaft axis than in a transverse direction to the direction of the rotor shaft axis. This is considered advantageous insofar as the torsional stiffness and vibration strength of the carrier structure are further improved.

The carrier part may have a bottom section, which is disposed at a non-vanishing angle with respect to the carrier section, the angle between the bottom section and the carrier section in particular being greater than or equal to 90°, in particular lying between 90° and 180°, in particular between 90° and 135°, and in particular between 100° and 120°. This is considered advantageous insofar as the torsional stiffness and vibration strength of the carrier structure are further improved.

The bottom section may be situated between two carrier sections, the carrier part substantially having a U-shaped cross-section, in particular. This is considered advantageous insofar as the carrier part may be hollow between the legs of the U, thereby reducing its weight, which benefits the environment.

A torque support may be connected to the carrier structure with the aid of a torque support plate. The torque support plate is connected to the carrier part in a form-locking manner, in particular by studs, especially in a form-locking and intermaterial manner, the torque support being connected to the torque support plate in a detachable manner, in particular using a screw-type connection. This has the advantage of allowing the drivetrain package to be connected to an application with the aid of the torque support. The torque support reduces a torque acting on the drivetrain package.

The torque support plate may be connected to the carrier structure in an intermaterial and form-fitting fashion. The resistance of the torque support plate with respect to transverse forces is therefore improved since the form-locking connection makes it more difficult for the torque support plate to be torn off from the carrier part.

The carrier structure may include a sheet metal part that is at least partially situated between two gear unit support sections, the sheet metal part being implemented as a bent part. This is considered advantageous insofar as the sheet metal part further improves the torsional stiffness and the vibration strength of the carrier structure.

The sheet metal part may have edge sections that extend transversely to the direction of the rotor shaft axis.

The carrier part may be arranged in two pieces, and two halves of the carrier part are intermaterially connected to each other, in particular by a welded connection, the carrier part in particular having a linear weld seam, especially a square butt weld, which extends in the direction of the rotor shaft axis, in particular. This has the advantage of allowing the carrier part to be bent and then welded in an uncomplicated manner.

The weld seam may be interrupted by at least one recess, in particular a recess that extends farther in a direction of the rotor shaft axis than it does in a transverse direction to the direction of the rotor shaft axis. This is considered advantageous insofar as material may be saved, which makes it possible to reduce the weight of the carrier structure.

Superfluous material during the powder coating or hot-dip galvanizing may be discharged with the aid of the recess so that additional material is able to be saved.

The two halves of the carrier part may be arranged in mirror symmetry to each other. This has the advantage that a uniform application of a downward force and torque to the two halves of the carrier part is possible.

The two halves may be produced using the same punching tool. Fewer tools are therefore required, and the environmental protection is improved.

The drivetrain package may include a clutch, in particular a hydraulic clutch, the clutch connecting the rotor shaft of the motor and an input shaft of the gear unit to each other; the carrier structure may include a trough that covers the region overlapped by the clutch in the direction of the rotor shaft axis. This has the advantage that fluid escaping from the clutch can be caught with the aid of the trough and does not spray or drip onto the application. This improves the safety.

The trough may be intermaterially connected to the carrier part, in particular by welding. This is considered advantageous since the trough further improves the torsional stiffness and the vibration strength of the carrier structure.

The drivetrain package may include a fan, which is situated between the clutch and the gear unit in the direction of the rotor shaft axis, a fan wheel of the fan being connected to the input shaft of the gear unit in a torsionally fixed manner. This has the advantage of allowing the gear unit to be cooled with the aid of the fan. The drivetrain package may have a compact design, and an additional fan motor is unnecessary.

The carrier structure may have a recesses, in particular transport bores, the recesses being implemented as punched or cut recesses. This has the advantage of allowing the recesses to be punched or cut out in a single production step with the carrier part.

The recesses may be arranged as transport eyelets or arranged to accommodate forks of a forklift. This offers the advantage that the drivetrain package may be fixated with the aid of the recesses when transported. Additional transport eyelets or retroactively implemented recesses are no longer necessary.

Further features and aspects of example embodiments of the present invention are described in greater detail below with reference to the Figures.

BRIEF DESCRIPTION OF THE DRAWINGS

FIG. 9 shows a detail view from FIG. 1.

FIG. 10 shows a schematic view of a support of the drivetrain package.

DETAILED DESCRIPTION

FIGS. 1, 2, 9 and 10 show a drivetrain package according to an example embodiment of the present invention.

Figure 3:
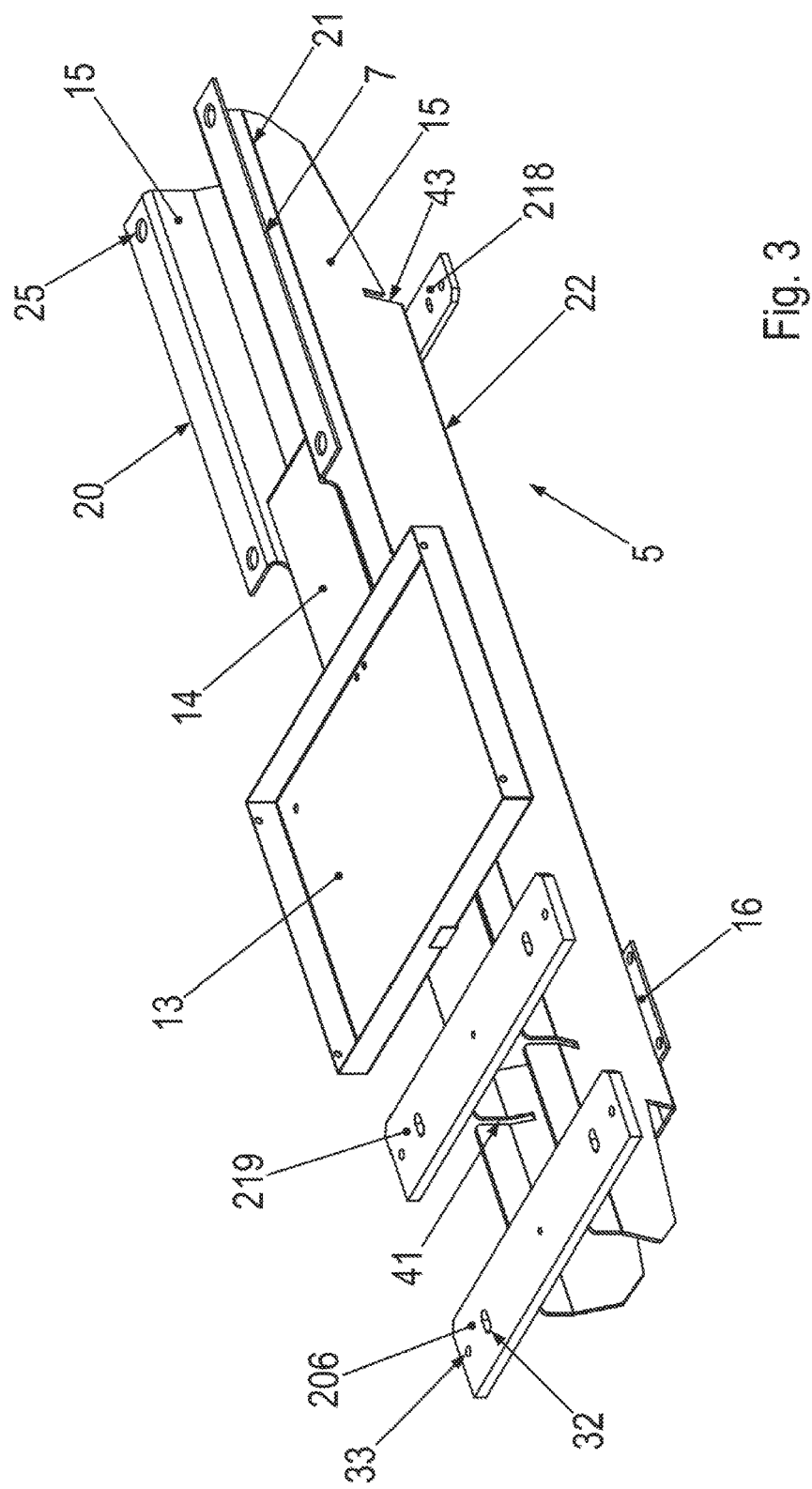
FIG. 3 shows an oblique view of a carrier structure of a drivetrain package according to an example embodiment of the present invention.
Figure 4:
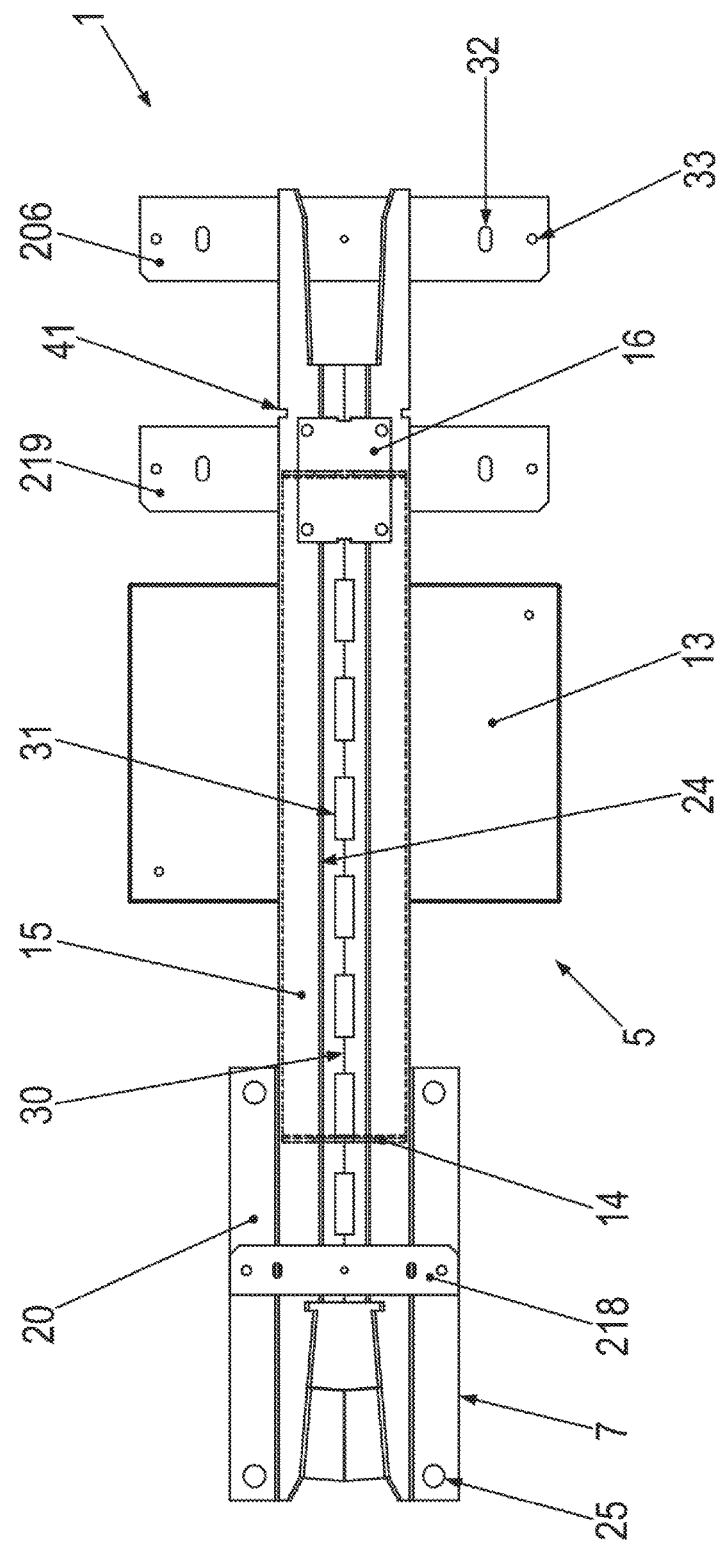
FIG. 4 shows a plan view of the carrier structure.
Figure 5:
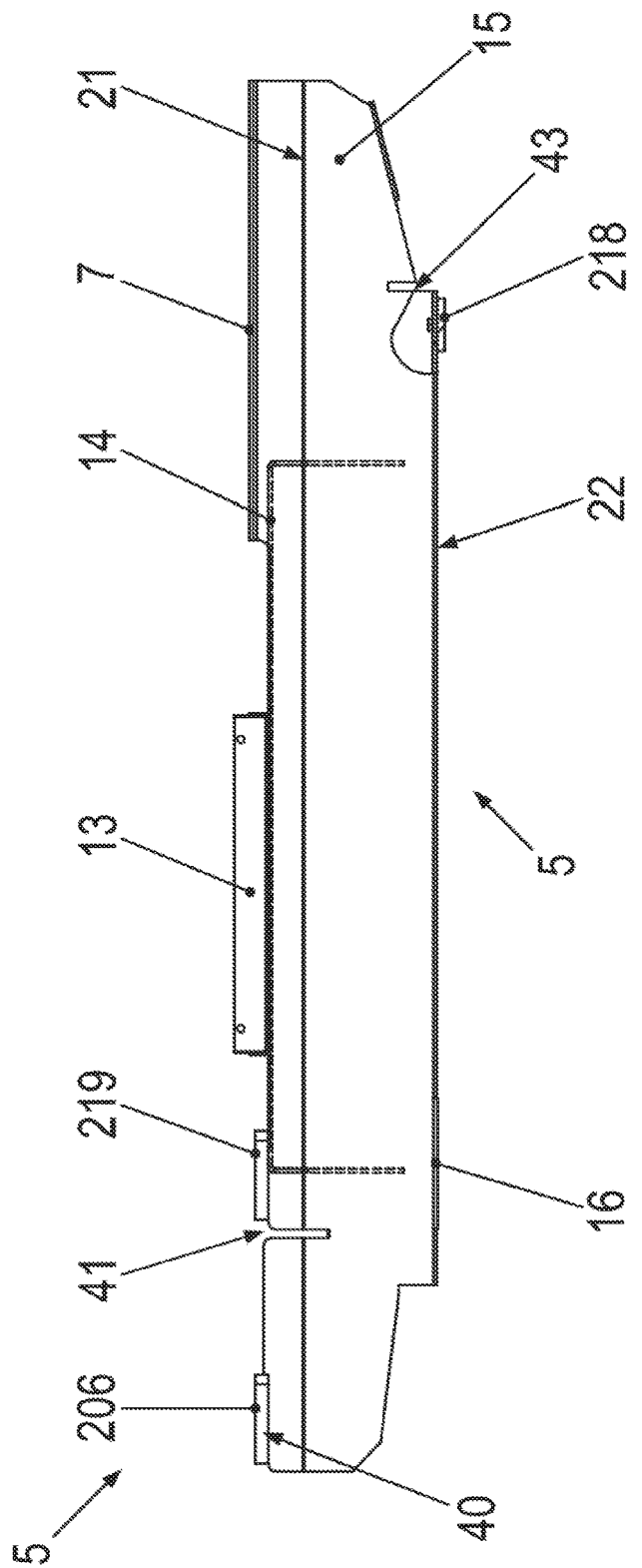
FIG. 5 depicts a side view of the carrier structure.

FIGS. 3, 4 and 5 show a drivetrain package according to an example embodiment of the present invention.

Figure 6:
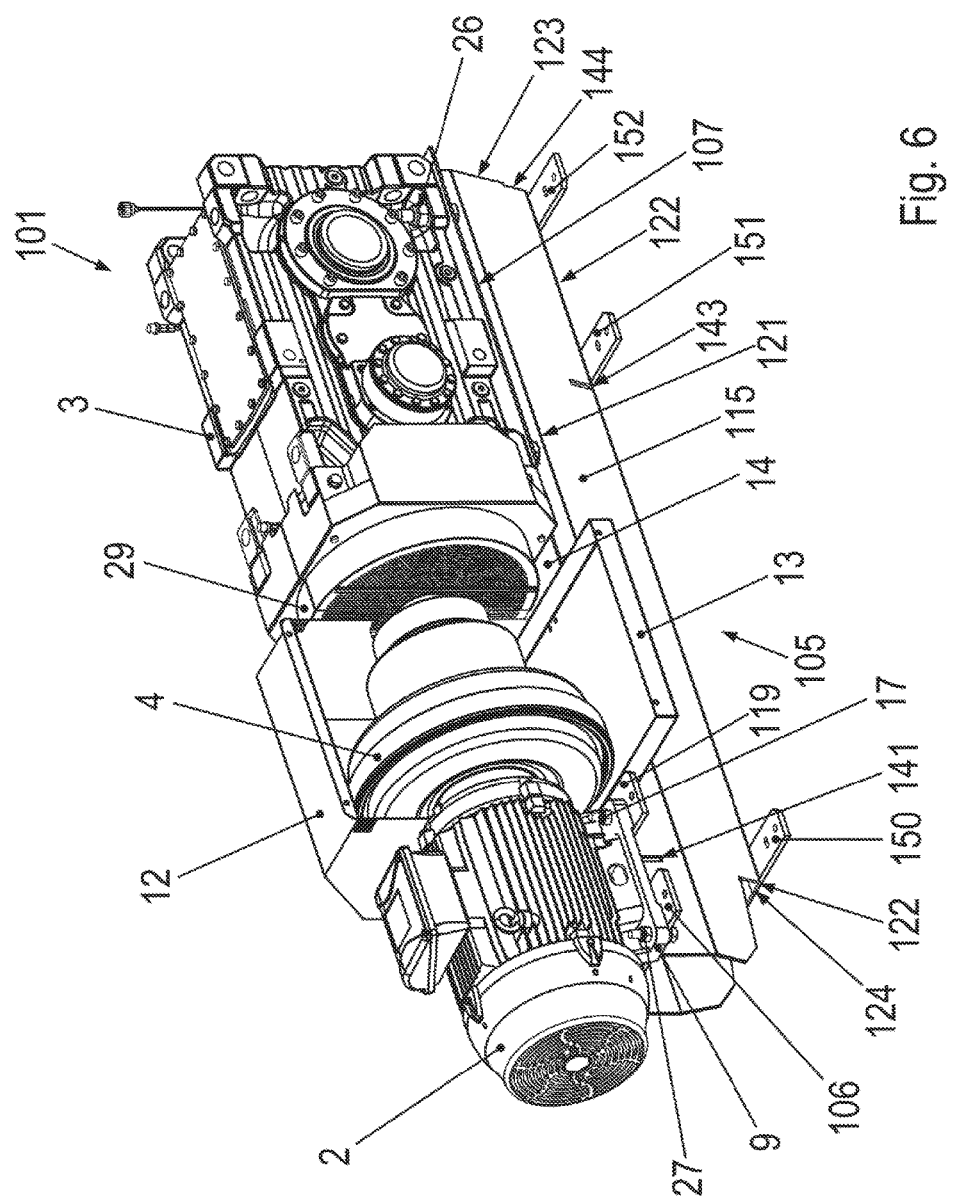
FIG. 6 shows an oblique view of a drivetrain package according to an example embodiment of the present invention.
Figure 7:
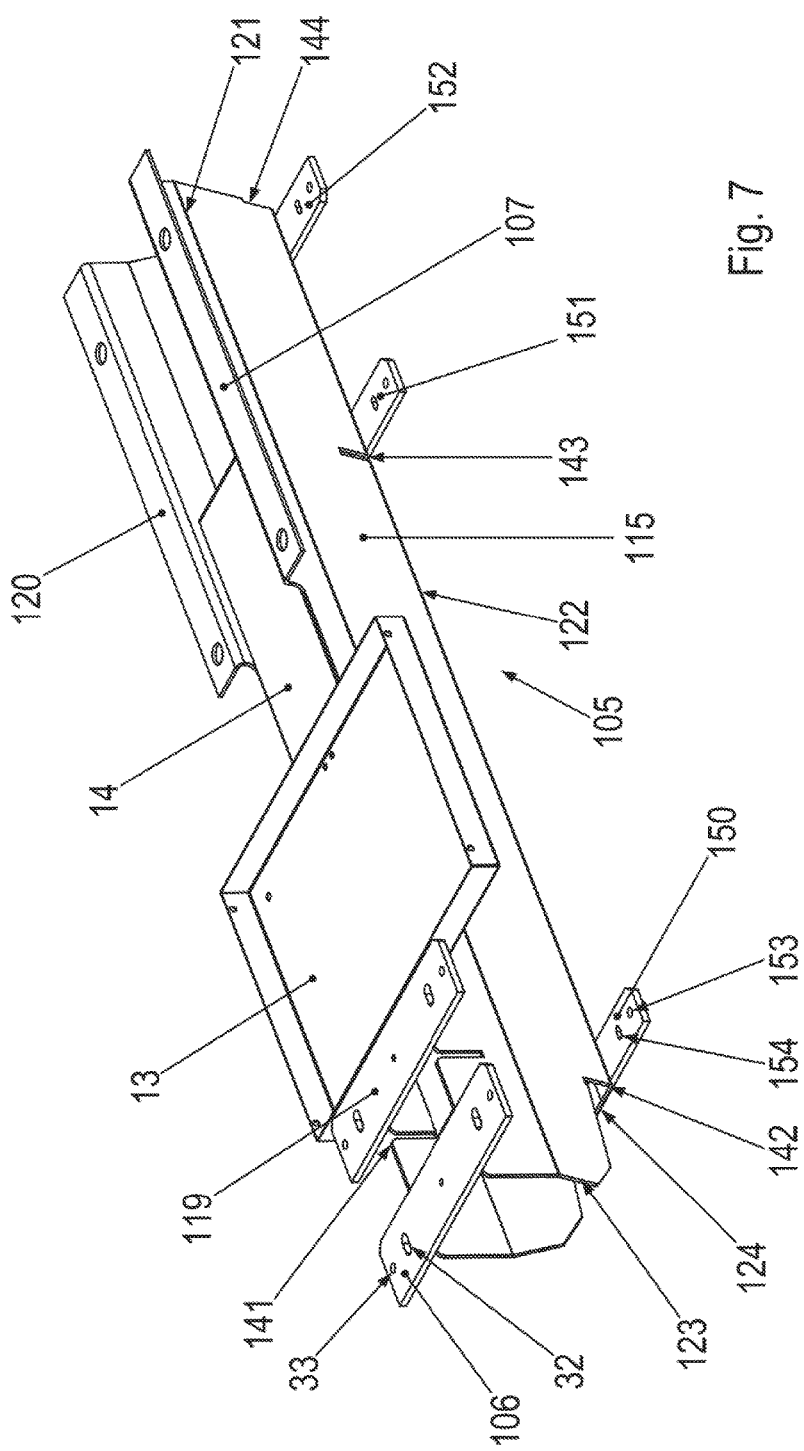
FIG. 7 shows an oblique view of a further carrier structure of the drivetrain package.
Figure 8:
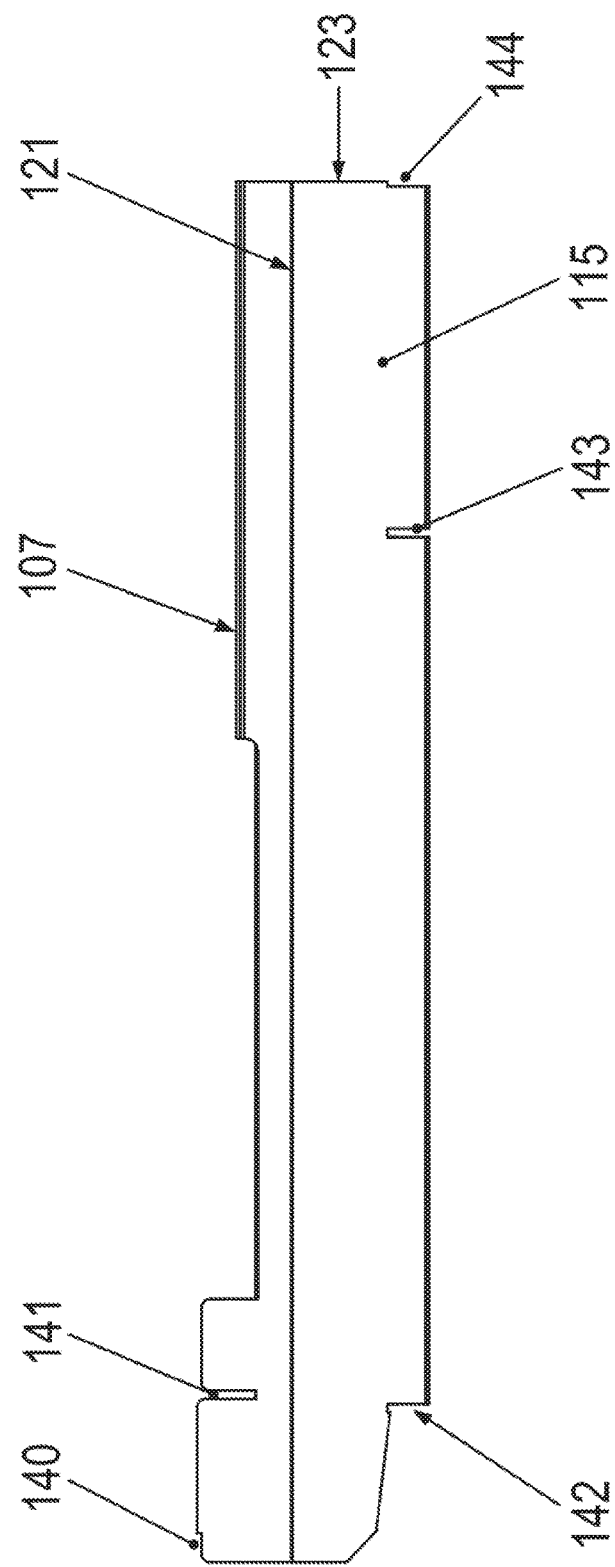
FIG. 8 depicts a carrier part of the carrier structure.

FIGS. 6, 7 and 8 show a drivetrain package according to an example embodiment of the present invention.

Identical parts in the exemplary embodiments have been provided with identical reference numerals.

Figure 1:
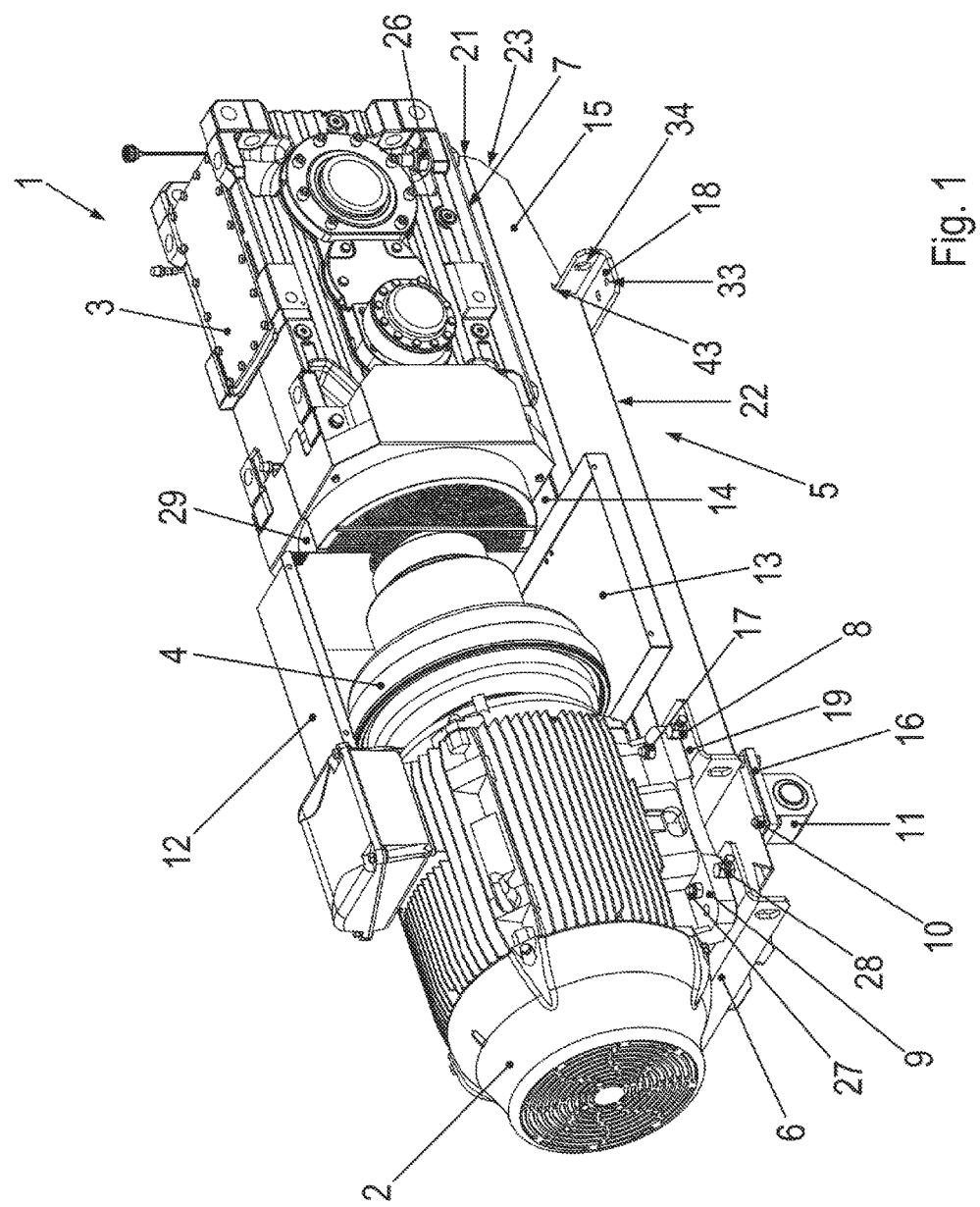
FIG. 1 shows an oblique view of a drivetrain package according to an example embodiment of the present invention.
Figure 2:
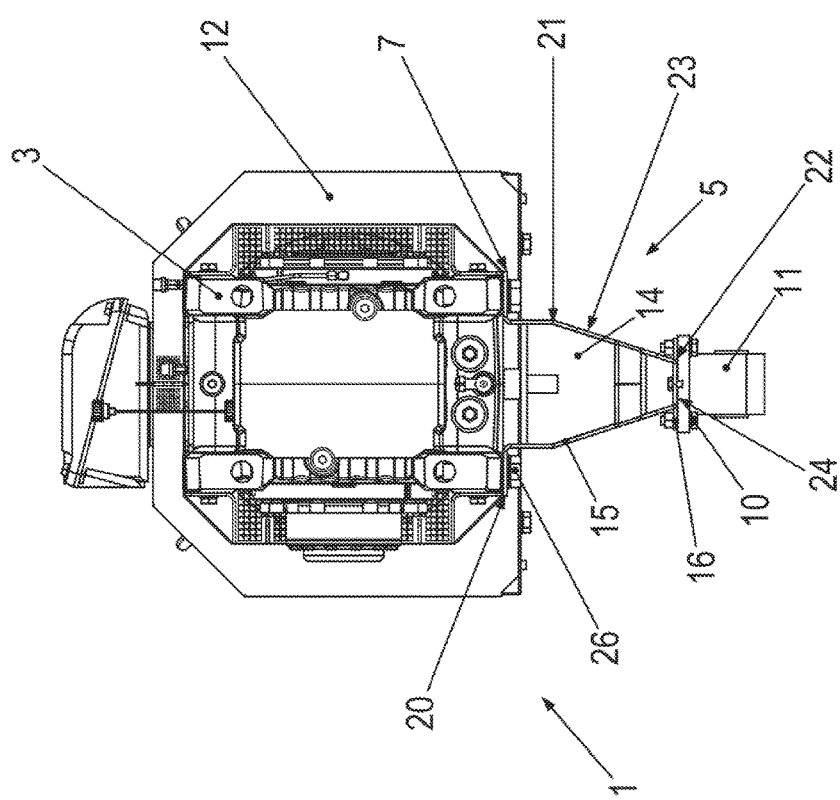
FIG. 2 shows a side view of the drivetrain package.

Drivetrain package 1 shown in FIGS. 1 and 2 has a motor 2, a gear unit 3, and a carrier structure 5. It is arranged as a motor swing base.

Motor 2 includes a rotor shaft. The rotor shaft defines a direction of the rotor shaft axis. A transverse direction with respect to the direction of the rotor shaft axis is defined as the horizontal transverse direction, which extends transversely to the downward force of the drivetrain package, in particular.

Carrier structure 5 has a carrier part 15, which includes two gear unit support sections (7, 20), and two motor support parts (6, 19).

Gear unit 3 is mounted on gear unit support sections (7, 20), for which purpose gear unit support sections (7, 20) include at least one recess 25 in each case. Recess 25 may be punched, laser-cut, autogenously cut or plasma-cut in a single working step with carrier part 15.

Gear unit 3 is detachably connected to the respective gear unit support section (7, 20) with the aid of a fastening element 8, in particular a screw, which is guided through a bore in the housing of gear unit 3 and through recess 25.

Motor 2 is mounted on motor support parts (6, 19). For this purpose, motor support parts (6, 19) are provided with at least one recess 32 in each case, e.g., an elongated hole, which is punched or laser-cut in a single working step with the respective motor support part (6, 19). The elongated hole extends farther in the direction of the rotor shaft axis than in a transverse direction to the direction of the rotor shaft axis.

Motor support parts (6, 19) extend farther in a transverse direction to the direction of the rotor shaft axis than carrier part 15. Each motor support part (6, 19) may include two recesses 32, and carrier part 15 is disposed between recesses 32 in this transverse direction to the direction of the rotor shaft axis.

Motor 2 is connected to respective motor support part (6, 19) in a detachable manner with the aid of a fastening element 9, in particular a screw, which is guided through a bore in a base part 9 of motor 2 and through recess 32.

Intermediate sheet metal sections are able to be placed between base part 9 of motor 2 and motor support parts (6, 19) for aligning the motor in a vertical direction. The sheet thickness of intermediate sheet metal sections amounts to between 1 mm and 5 mm.

Carrier part 15 is arranged as a sheet metal part. Carrier part 15 is arranged, for example, as a punched and bent sheet metal part or produced using a cutting method, in particular using a laser cutting method. Carrier part 15 may be produced in a single working step with slots and recesses in carrier part 15.

Carrier part 15 includes gear unit support sections (7, 20), two carrier sections 23, and a bottom section 24. Bottom section 24 may connect the two carrier sections 23. For example, carrier part 15 has a substantially U-shaped cross-section.

Bottom section 24 is situated at a non-vanishing angle to the respective carrier section 23. The angle between bottom section 24 and respective carrier section 23 may be greater than or equal to 90°, and in particular amounts to between 90° and 180°, in particular to between 90° and 135°, and in particular to between 100° and 120°. Bottom section 24 is situated at an angle relative to carrier section 23. An edge section 22, which extends in the direction of the rotor shaft axis, is situated between bottom section 24 and carrier section 23.

Carrier sections 23 have an edge section 21 in each case, which extends through entire carrier part 15 in the direction of the rotor shaft axis. Two subsections of each carrier section 23, which are connected to each other by edge section 21, are thus situated at a non-vanishing angle with respect to each other. This angle amounts to between 90° and 180°, in particular to between 135° and 180°, and in particular to between 150° and 170°.

Depending on the size of motor 2 and gear unit 3, the height of carrier sections 23 in the axial region of motor support parts (6, 19) is greater, smaller or the same in the axial region of gear unit support sections (7, 20). During the production process by punching or cutting, the height of carrier sections 23 is infinitely adaptable to any combination of motor 2 and gear unit 2. The sheet metal thickness of carrier structure 5 is able to be adapted to the size and weight of motor 2 and gear unit 3.

Carrier part 15 is implemented in two pieces, the two halves of carrier part 15 being arranged in mirror symmetry with respect to each other and connected to each other by welding, in particular by a linear weld seam 30, especially a square butt weld. The two halves of carrier part 15 are interconnected with the aid of a linear-type connection section, the connection section extending in the direction of the rotor shaft axis. For example, carrier part 15 has recesses along the connection section of the two halves, weld seam 30 being interrupted by the recesses, in particular.

A sheet metal part 14 is situated between the two carrier sections 23 of carrier part 15. Sheet metal part 14 is arranged as a bent part, and may have three subsections that are disposed at a non-vanishing angle with respect to one another, e.g., at a right angle, in each case. The subsections define a respective plane, two planes intersecting the third plane. The lines of intersection of the planes extend transversely to the direction of the rotor shaft axis. Sheet metal part 14 is connected to carrier part 15 in an intermaterial manner, in particular by welding.

Carrier structure 5 includes a torque support 11. Torque support 11 is connected to bottom section 24 of carrier part 15 with the aid of a torque support plate 16. For example, torque support 11 is connected to torque support plate 16 in a detachable manner using a fastening element 10, in particular a screw part.

Torque support plate 16 is connected to bottom section 24 of carrier part 15 in a form-locking manner using at least one stud and intermaterially connected by a weld joint. Torque support plate 16 may have at least one stud, which is accommodated, in particular fully accommodated, in a recess in bottom section 24.

Torque support 11 includes an uninterrupted recess that extends transversely to the direction of the rotor shaft axis.

The extension of torque support 11 in a transverse direction to the direction of the rotor shaft axis is greater than that of bottom section 24. The extension of torque support 11 transversely to the direction of the rotor shaft axis may be the same as the extension of bottom section 24. Torque support plate 16 has a greater extension in a transverse direction to the direction of the rotor shaft axis than torque support 11.

As schematically illustrated in FIG. 10, carrier part 315 is mounted on a carrier 657, in particular a steel carrier, with the aid of torque support 311. Carrier 357 includes a recess for this purpose, in particular an uninterrupted recess, into which a bolt 356 is inserted. Bolt 356 connects torque support 311 to carrier 357 in that bolt 356 is inserted into the recess in carrier 357 and, in particular, extends through this recess. Bolt 356 may be intermaterially connected, in particular welded, to carrier 357 and torque support 311.

Carrier 357 may be connected to a foundation and/or an to application that is to be driven by the drive unit.

The drivetrain package 301 is connected to an application to be driven with the aid of an output shaft 355 of the gear unit. The axis of rotation of the output shaft may extend transversely to the rotor shaft axis.

In the idle state of drivetrain package 301, the downward force of drivetrain package 301 distributes itself evenly on carrier 357, connected to drivetrain package 301 via torque support 311, and to the application, which is connected to drivetrain package 301 via output shaft 355.

In the operating state of drivetrain package 301, the load distribution changes as a function of the direction of rotation and the rotational speed of output shaft 355. As a result, either pressure forces or tractive forces are acting on torque support 311, or an equilibrium comes about between the downward force and the force that results from the torque of drivetrain package 301.

Gear unit 303 may include a flange, in particular a flange that surrounds output shaft 355 in the circumferential direction of output shaft 355. The flange makes it possible to connect gear unit 303, and thus drivetrain package 301, to an application so that in the idle condition of drivetrain package 301, the downward force of drivetrain package 301 is evenly distributed to carrier 357 and to the application connected to drivetrain package 301 with the aid of the flange.

Gear unit support sections (7, 20) are arranged in one piece with carrier part 15. The respective gear unit support section (7, 20) is situated at a non-vanishing angle, e.g., at a right angle, to respective carrier section 23 of carrier part 15. Gear unit support sections (7, 20) may be produced by bending.

Motor support parts (6, 19) are arranged as sheet metal parts, in particular as punched and bent sheet metal parts. Motor support parts (6, 19) may be arranged as angled parts or angle sheet parts, in particular rectangular parts. Each motor support part (6, 19) may have two motor support subsections that are disposed at an angle of between 45° and 135°, e.g., at a right angle, with respect to each other.

Carrier part 15 includes at least one positioning slot 41 and at least one alignment slot 40 for accommodating motor support parts (6, 19). Positioning slot 41 extends deeper into carrier part 15 than alignment slot 40.

A motor support part 19 is situated in positioning slot 41. For example, a motor support subsection of this motor support part 19 is accommodated by positioning slot 41, in particular completely.

A motor support part 6 rests on carrier part 15 and is aligned at alignment slot 40. A side section of this motor support part 6 may be in contact with alignment slot 40.

Motor support parts (6, 19) are connected to carrier part 15 by form-locking with the aid of positioning slot 41 and/or alignment slot 40 and intermaterially joined, e.g., by welding, a linear weld seam, a square butt weld, etc.

On the side lying opposite from gear unit support section (7, 20), carrier part 15 has at least one additional positioning slot 43, the additional positioning slot 43, e.g., abutting bottom section 24.

A transport sheet metal part 18 is able to be positioned with the aid of additional positioning slot 43. Transport sheet metal part 18 may have the same structural configuration as motor support part (6, 19). Transport sheet metal part 18 is at least partially inserted into additional positioning slot 43 and connected to carrier part 15 by form-locking, utilizing additional positioning slot 43, and connected to carrier part 15 by friction-locking, e.g., via a detachable connection, in particular a screw connection. Transport sheet metal part 18 extends farther in a transverse direction to the direction of the rotor shaft axis than bottom section 24.

Transport sheet metal part 18 includes a recess 33 by which the drivetrain package may be connected to the transport device in a detachable manner when being transported on a transport device, in particular a transport pallet. Transport sheet metal part 18 is connectable to the transport device, e.g., by a screw that is guided through recess 33.

Transport sheet metal part 18 is provided with an additional recess 34, which extends through transport sheet metal part 18 parallel to the direction of the rotor shaft axis. Additional recess 34 is aligned transversely to recess 33. Additional recess 34 makes it possible for a crane, in particular a crane hook, to be connected to the drivetrain package in order to transport the drivetrain package.

Transport sheet metal part 18 extends farther in a transverse direction to the direction of the rotor shaft axis than carrier part 15. Transport sheet metal part 18 may have two recesses 33, and carrier part 15 is situated transversely to the direction of the rotor shaft axis between the two recesses 33.

A sheet metal part that may be used as a motor support part (6, 19) or as a transport sheet metal part 18 thus includes two recesses (32, 33), one recess being implemented as an elongated hole, in particular. The sheet metal part may have two pairs of recesses (32, 33), and the carrier part is situated in a transverse direction to the direction of the rotor shaft axis between the pairs of recesses (32, 33).

The rotor shaft of motor 2 and an input shaft of gear unit 3 are connected to each other by a clutch 4. Clutch 4 may be arranged as a turbo clutch or as a hydraulic clutch.

A trough 13, which is connected to a carrier part 15, in particular by welding, is disposed on carrier part 15. Trough 13 is situated underneath clutch 4 and may be used to catch fluid that escapes from clutch 4.

A cover 12 covers clutch 4. Cover 12 is used as a contact guard for clutch 4.

A fan 29 for cooling the gear unit is situated between clutch 4 and gear unit 3 in the direction of the rotor shaft axis. The fan wheel of fan 29 is coupled to the input shaft of gear unit 3 in a torsionally fixed manner.

The drivetrain package shown in FIGS. 3 through 5 differs from from that described above in that that motor support parts (206, 219) and transport sheet metal part 218 are arranged as flat sheet metal parts, and thus are not angled.

Motor support parts (206, 219) rest on carrier part 15 and are intermaterially joined thereto, e.g., by welding. Transport sheet metal part 218 rests on carrier part 15 and is connected to carrier part 15 in a detachable manner, e.g., using a screw.

Motor support parts (206, 219) and transport sheet metal part 218 have two respective recesses (153, 154). One recess 154 is suitable for mounting motor 2 and may be arranged as an elongated hole. A recess 153 is suitable for connecting the drivetrain package to a transport device, especially a transport pallet.

Instead of torque support 11, the drivetrain package 101 shown in FIGS. 6 through 8 has at least two base parts (150, 151, 152) and is arranged as a foundation frame.

Drivetrain package 101 includes a carrier structure 105, which has a carrier part 115 that includes two gear unit support sections (107, 120) and two motor support parts (6, 19).

Carrier part 115 is disposed between motor support parts (6, 19) and base parts (150, 151, 152) in the vertical direction. The downward force of motor 2 is conducted from motor support parts (6, 19) to base parts (150, 151, 152) with the aid of carrier part 115.

Base parts (150, 151, 152) are arranged in the same manner as motor support parts (6, 19). The extension of base parts (150, 151, 152) in a transverse direction to the direction of the rotor shaft axis is greater than that of the bottom section.

Carrier structure 5 is able to be fixed in place on a foundation with the aid of a respective recess in base parts (150, 151, 152). A screw is guided through the respective recess and screwed to the foundation for this purpose.

Carrier part 115 is arranged as a sheet metal part. Carrier part 115 may be arranged as a punched and bent part or produced using a cutting method, in particular using a laser cutting method. Carrier part 115 has gear unit support sections (107, 120), two carrier sections 123, and a bottom section 124. Bottom section 124 may connect the two carrier sections 123.

Bottom section 124 is situated at a non-vanishing angle to respective carrier section 123. The angle between bottom section 124 and respective carrier section 123 may be greater than or equal to 90°, and in particular amounts to between 90° and 180°, in particular to between 90° and 135°, in particular to between 100° and 120°. Bottom section 124 is disposed at an angle relative to carrier section 23. An edge section 122 is situated between bottom section 124 and carrier section 123.

Carrier sections 123 have an edge section 121 in each case, which extends through entire carrier part 115 in the direction of the rotor shaft axis. Two subsections of each carrier section 123 that are connected to each other via edge section 121 are thus disposed at a non-vanishing angle with respect to each other. This angle lies between 90° and 180°, and in particular between 135° and 180°, in particular between 150° and 170°.

Carrier part 115 is arranged in two parts, the two halves of carrier part 115 being arranged in mirror symmetry with respect to each other and interconnected by welding, in particular by a linear weld seam, especially a square butt weld. The two halves of carrier part 115 are connected to each other with the aid of a linear connecting section, the connecting section extending in the direction of the rotor shaft axis. Carrier part 115 may include recesses along the connection section of the two halves, the weld seam in particular being interrupted by the recesses.

A sheet metal part 114 is situated between the two carrier sections 123 of carrier part 115. Sheet metal part 114 is arranged as a bent part, and may have three subsections that are disposed at a non-vanishing angle, e.g., at a right angle, with respect to each other. The subsections define a respective plane, and two planes intersect the third plane. The lines of intersection of the planes extend in a transverse direction to the direction of the rotor shaft axis.

Gear unit support sections (107, 120) are arranged in one piece with carrier part 115. The respective gear unit support section (107, 120) is disposed at a non-vanishing angle, e.g., at a right angle, to the respective carrier section 123 of carrier part 115. Gear unit support sections (107, 120) may be produced by bending.

Carrier part 115 includes at least one positioning slot 141 and at least one alignment slot 140 in order to accommodate motor support parts (6, 19). Positioning slot 141 extends deeper into carrier part 115 than alignment slot 140.

A motor support part 19 is situated inside positioning slot 141. For example, a motor support subsection of this motor support part 19 is accommodated by positioning slot 141, in particular completely.

A motor support part 6 rests on carrier part 115 and is aligned at alignment slot 140. A side section of this motor support part 6 may be in contact with alignment slot 140.

Motor support parts (6, 19) are welded to carrier part 115, e.g., by a linear weld seam, in particular a square butt weld.

On the side lying opposite from gear unit support section (107, 120), carrier part 115 includes at least one further positioning slot 143. Further positioning slot 143 may abut bottom section 124.

Positioning slot 143 may be used to position a base part 151. Base part 151 is at least partially introduced into positioning groove 143 and is permanently connected to carrier part 15, in particular by welding. Base part 151 extends farther in a transverse direction to the direction of the rotor shaft axis than bottom section 124.

On the side situated opposite from motor support part (6, 19), carrier part 115 includes an alignment slot 142. Alignment slot 142 may abut bottom section 124. Alignment slot 142 makes it possible to align a base part 150 relative to carrier part 115. Base part 150 may be in contact with alignment slot 142.

On the side opposite from gear unit support section (107, 120), carrier part 115 includes an alignment slot 144. Alignment slot 144 may abut bottom section 124. Alignment slot 144 may be used to align a base part 152 relative to carrier part 115. Base part 152 may be in contact with alignment slot 144.

Carrier part (15, 115) may include additional recesses which are produced in a single working step with the carrier part. These additional recesses may be used as receptacles for forks of a forklift or as transport eyelets, for example.

Carrier structure (5, 105) may be provided with a corrosion-resistant coating. Carrier structure (5, 105) may be hot-dip galvanized or powder-coated.

As an alternative, the base parts and the motor support parts may be arranged as flat sheet metal parts, in the same manner as the motor support parts (206, 219).

FIG. 9 shows a detail view of FIG. 1. An alignment device 8 for aligning motor 2 relative to carrier structure 5 is situated on motor support part 19. Alignment device 8 has a bolt 50, which is partially situated in recess 33 of motor support part 19.

The bolt has a step-type taper. One step is in contact with motor carrier part 19. The tapered region of bolt 50 is inserted into and/or bonded to recess 33. As an alternative, the bolt is connected to recess 33 by screws, recess 33 being arranged as a threaded bore in this case.

As an alternative, the tapered region has a thread that is fully guided through recess 33. Bolt 50 is connected to a nut with the aid of the thread.

As an alternative, the tapered region of bolt 50 has an uninterrupted bore that is routed completely through recess 33. A splint is able to be introduced into the bore by which bolt 50 may be detachably connected to motor support part 19.

As an alternative, the tapered region of bolt 50 has a circumferential groove, which is routed completely through recess 33. A securing ring is used to connect bolt 50 to motor support part 19 in a detachable manner.

Alignment device 28 is arranged as a metal part and, in particular, made from stainless steel, e.g., V2A stainless steel. Alignment device 28 may be produced from semifinished products such as a hexagonal part, a square part, or from round steel, especially as a lathe-cut part.

As an alternative to bolt 50, a flat bar having a welded-on stud may be used, the stud being inserted into the recess, and the flat bar having a threaded bore for screw part 52.

Bolt 50 has a threaded bore to which a screw part 52 is connected by a screwed connection. Screw part 52 is in contact with motor 2. A nut 51, which may be used to secure screw part 52 relative to motor 2, is disposed on screw part 52.

Using at least one fastening element (17, 27), motor 2 is connected to motor support part 19 in a detachable manner. Base part 9 of the motor includes at least one recess for this purpose. Fastening element (17, 27) is guided through the recess in base part 9 and through recess 32.

With the aid of screw part 52, motor 2 is able to be moved in a horizontal transverse direction to the direction of the rotor shaft axis.

Using the intermediate sheet metal section, motor 2 may be moved in the vertical transverse direction.

Drivetrain package 1 may have at least two alignment devices 28 that are situated opposite each other. Motor 2 is situated in a transverse direction to the direction of the rotor shaft axis, between alignment devicesd 28. Thus, using a first alignment device 28, it is possible to press motor 2 in a first horizontal transverse direction to the direction of the rotor shaft axis, and using a second alignment device 28, it is possible to press motor 2 in a second horizontal transverse direction that extends counter to the first transverse direction.

When assembling drivetrain package 1, motor 2 is moved relative to carrier structure 5 so that the output shaft of motor 2 and the input shaft of gear unit 3 may be aligned in a coaxial manner. For this purpose, motor 2 is connected by hand to carrier structure 5 with the aid of at least one fastening element (17, 27), which is guided through a recess in base section 9 of motor 2 and through recess 32 in motor support part 19. Screw part 52 is screwed through the threaded bore in bolt 50 until screw part 52 touches base part 9 of motor 2. Screw part 52 is then further screwed so that it presses against motor 2 and shifts motor 2 in a horizontal transverse direction to the direction of the rotor shaft axis. As soon as motor 2 is aligned in the horizontal transverse direction, screw part 52 is secured against bolt 50 with the aid of nut 51, whereupon fastening element (17, 27) is fixed in place.

Alignment device 28 may then be removed again to be reused for another drive shaft package, or it may remain on the carrier structure for a renewed alignment.

Recess 33 is able to be sealed with the aid of a cover part, in particular a plastic cover part.

LIST OF REFERENCE NUMERALS 1 drivetrain package
2 motor
3 gear unit
4 clutch
5 carrier structure
6 motor support part
7 gear unit support section
8 alignment device
9 base part
10 fastening element
11 torque support
12 cover
13 trough
14 sheet metal part
15 carrier part
16 torque support plate
17 fastening element
18 transport sheet metal part
19 motor support part
20 gear unit support section
21 edge section
22 edge section
23 carrier section
24 bottom section
25 recess
26 fastening element
27 fastening element
28 alignment device
29 fan
30 weld seam
31 recess
32 recess, in particular an elongated hole
33 recess, in particular an elongated hole
34 recess
40 alignment slot
41 positioning slot
43 positioning slot
50 bolt
51 nut
52 screw part
101 drivetrain package
105 carrier structure
106 motor support part
107 gear unit support section
115 carrier part
119 motor support part
120 gear unit support section
121 edge section
122 edge section
123 carrier section
124 bottom section
140 alignment slot
141 positioning slot
142 alignment slot
143 positioning slot
144 alignment slot
150 base part
151 base part
152 base part 153 recess
154 recess, in particular an elongated hole
206 motor support part
218 transport sheet metal part
219 motor support part
301 drivetrain package
302 motor
303 gear unit
304 clutch
311 torque support
315 carrier part
355 output shaft
356 bolt
357 carrier

The invention claimed is:

1. A drivetrain package, comprising:
a motor having a rotor shaft;
a gear unit; and
a carrier structure having a carrier part including a gear unit support section and a motor support part, the carrier part and the gear unit support section being arranged in one piece;
wherein the motor is mounted on the carrier structure by the motor support part, the motor support part being arranged between the motor and the carrier part;
wherein the gear unit is supported on the gear unit support section and connected to the carrier structure by the gear unit support section;
wherein the carrier part and the motor support part include sheet metal parts;
wherein the carrier part extends farther in a direction of a rotor shaft axis than in a transverse direction to the direction of the rotor shaft axis; and
wherein the motor support part extends farther in a transverse direction to the direction of the rotor shaft axis than in the direction of the rotor shaft axis.

2. The drivetrain package according to claim 1, wherein the carrier structure includes a base part, and the carrier structure is supported by the base part on a foundation and/or on a floor, the motor support part and the base part having a similar and/or identical configuration, the base part extending farther in a transverse direction to the direction of the rotor shaft axis than in the direction of the rotor shaft axis.

3. The drivetrain package according to claim 1, wherein the motor support part and the base part each have a first recess and a second recess, the motor adapted to be connected to the carrier structure by a fastening element that is guided through the first recess, the first recess including as an elongated hole that extends farther in the direction of the rotor shaft axis than in a transverse direction to the direction of the rotor shaft axis, the carrier structure adapted to be mounted on a foundation and/or on a floor by a fastening element that is guided through the second recess.

4. The drivetrain package according to claim 2, wherein the carrier part, the motor support part, and/or the base part includes a bent part, a punched and bent part, and/or an angled sheet metal part.

5. The drivetrain package according to claim 1, wherein the carrier part includes two subsections that are disposed at a non-vanishing angle with respect to each other, the angle being between 90° and 180°, between 135° and 180°, and/or between 150° and 170°, an edge section, which extends completely through the carrier part in the direction of the rotor shaft axis, being situated between the subsections.

6. The drivetrain package according to claim 2, wherein the motor support part and/or the base part is connected to the carrier part by form-locking, by an intermaterial connection, and/or by welding, the carrier part including at least one positioning slot for connection to the motor support part or to the base part.

7. The drivetrain package according to claim 1, wherein the carrier part includes a carrier section that extends from the motor to the gear unit, the gear unit support section arranged at a non-vanishing angle to the carrier section, the gear unit support section arranged at a right angle to the carrier section, the gear support section extending farther in the direction of the rotor shaft axis than in a transverse direction to the direction of the rotor shaft axis.

8. The drivetrain package according to claim 1, wherein the carrier part includes a bottom section arranged at a non-vanishing angle to the carrier section, the angle between the bottom section and the carrier section being greater than or equal to 90°, between 90° and 180°, between 90° and 135°, and/or between 100° and 120°, the bottom section being disposed between two carrier sections having a substantially U-shaped cross-section.

9. The drivetrain package according to claim 1, wherein a torque support is connected to the carrier structure by a torque support plate, the torque support plate connected to the carrier part by form-locking, by studs, and/or in a form-locking and an intermaterial manner, the torque support connected to the torque support plate in a detachable manner and/or by a screw connection.

10. The drivetrain package according to claim 1, wherein the carrier structure includes a sheet metal part, including a bent part, at least partially situated between two gear unit support sections.

11. The drivetrain package according to claim 1, wherein the carrier part includes two parts, two halves of the carrier part being intermaterially connected and/or welded to each other, the carrier part having a linear weld seam and/or a square butt weld that extends in the direction of the rotor shaft axis, the weld seam being interrupted by at least one recess and/or a recess that extends farther in the direction of the rotor shaft axis than in a transverse direction to the direction of the rotor shaft axis, the two halves of the carrier part being arranged in mirror symmetry with respect to each other.

12. The drivetrain package according to claim 1, further comprising a clutch and/or a hydraulic clutch connecting the rotor shaft of the motor and an input shaft of the gear unit to each other, the carrier structure including a trough that overlaps a region covered by the clutch in the direction of the rotor shaft axis, the trough being intermaterially connected to and/or welded to the carrier part.

13. The drivetrain package according to claim 1, further comprising a fan arranged between a clutch and the gear unit in the direction of the rotor shaft axis, a fan wheel of the fan being connected to an input shaft of the gear unit in a torsionally fixed manner.

14. The drivetrain package according to claim 1, wherein the carrier structure includes recesses and/or recesses arranged as transport bores, the recesses including as punched and/or cut recesses.

15. The drivetrain package according to claim 14, wherein the recesses are arranged as transport eyelets and/or for accommodation of forks of a fork lift.

* * * * *